US012330269B2

(12) United States Patent
Graham et al.

(10) Patent No.: US 12,330,269 B2
(45) Date of Patent: Jun. 17, 2025

(54) FLEXIBLE ABRASIVE ARTICLE WITH IMAGE LAYER

(71) Applicant: 3M INNOVATIVE PROPERTIES COMPANY, St. Paul, MN (US)

(72) Inventors: Paul D. Graham, Woodbury, MN (US); Douglas A. Davis, Cottage Grove, MN (US); Shigeaki Dohgoshi, Tokyo (JP); Kanta Kumar, Woodbury, MN (US); Satoshi Matsuda, Tendo (JP); Jon P. Nietfeld, Woodbury, MN (US); Thomas E. Pahl, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 884 days.

(21) Appl. No.: 16/757,696

(22) PCT Filed: Oct. 26, 2018

(86) PCT No.: PCT/IB2018/058388
§ 371 (c)(1),
(2) Date: Apr. 20, 2020

(87) PCT Pub. No.: WO2019/082148
PCT Pub. Date: May 2, 2019

(65) Prior Publication Data

US 2021/0197340 A1 Jul. 1, 2021

Related U.S. Application Data

(60) Provisional application No. 62/577,431, filed on Oct. 26, 2017.

(51) Int. Cl.
*B24D 3/00* (2006.01)
*B24D 11/00* (2006.01)
(Continued)

(52) U.S. Cl.
CPC ............ *B24D 3/004* (2013.01); *B24D 11/001* (2013.01); *B24D 11/02* (2013.01); *B41M 3/12* (2013.01)

(58) Field of Classification Search
CPC .......... B24D 3/004; B24D 11/00; B24D 11/02
(Continued)

(56) References Cited

U.S. PATENT DOCUMENTS

| | | |
|---|---|---|
| 4,250,053 A | 2/1981 | Smith |
| 4,256,828 A | 3/1981 | Smith |

(Continued)

FOREIGN PATENT DOCUMENTS

| | | |
|---|---|---|
| JP | 2008036916 | 2/2008 |
| WO | WO 2006-098899 | 9/2006 |

(Continued)

OTHER PUBLICATIONS

International Search Report for PCT International Application No. PCT/IB2018/058388, mailed on Feb. 19, 2019, 2 pages.

*Primary Examiner* — Pegah Parvini

(57) ABSTRACT

An abrasive article having a removable support sheet having a first major surface. An image layer containing inks applied over the first major surface. A polyurethane backing layer having a first major backing surface located adjacent to the image layer and a second major backing surface opposite the first major surface. A functional layer comprising an abrasive layer applied to the second major surface; the abrasive layer comprising a make coat, abrasive particles and a size coat.

14 Claims, 1 Drawing Sheet

(51) Int. Cl.
*B24D 11/02* (2006.01)
*B41M 3/12* (2006.01)

(58) Field of Classification Search
USPC .................... 451/534, 51, 59, 295, 526, 548
See application file for complete search history.

(56) References Cited

U.S. PATENT DOCUMENTS

| | | | | |
|---|---|---|---|---|
| 4,314,827 | A | 2/1982 | Leitheiser | |
| 4,518,397 | A | 5/1985 | Leitheiser | |
| 4,623,364 | A | 11/1986 | Cottringer | |
| 4,652,275 | A | 3/1987 | Bloecher | |
| 4,744,802 | A | 5/1988 | Schwabel | |
| 4,751,138 | A | 6/1988 | Tumey | |
| 4,770,671 | A | 9/1988 | Monroe | |
| 4,799,939 | A | 1/1989 | Bloecher | |
| 4,881,951 | A | 11/1989 | Wood | |
| 4,985,340 | A | 1/1991 | Palazzotto | |
| 5,011,508 | A | 4/1991 | Wald | |
| 5,059,701 | A | 10/1991 | Keipert | |
| 5,078,753 | A | 1/1992 | Broberg | |
| 5,090,968 | A | 2/1992 | Pellow | |
| 5,139,978 | A | 8/1992 | Wood | |
| 5,191,101 | A | 3/1993 | Palazzotto | |
| 5,201,916 | A | 4/1993 | Berg | |
| 5,227,104 | A | 7/1993 | Bauer | |
| 5,252,694 | A | 10/1993 | Willett | |
| 5,366,523 | A | 11/1994 | Rowenhorst | |
| 5,429,647 | A | 7/1995 | Laramie | |
| 5,498,269 | A | 3/1996 | Larmie | |
| 5,506,189 | A | 4/1996 | Chou | |
| 5,549,962 | A | 8/1996 | Holmes | |
| 5,551,963 | A | 9/1996 | Larmie | |
| 5,552,225 | A | 9/1996 | Ho | |
| 5,556,437 | A | 9/1996 | Lee | |
| 6,228,486 | B1 | 5/2001 | Kittel | |
| 6,258,138 | B1 | 7/2001 | DeVoe | |
| 6,497,781 | B1 | 12/2002 | Dalvey | |
| 6,712,532 | B2 | 3/2004 | Look | |
| 6,916,751 | B1 | 7/2005 | Kronzer | |
| 7,125,611 | B2 | 10/2006 | Kung | |
| 8,011,411 | B2 | 9/2011 | Eitel | |
| 8,123,891 | B2 | 2/2012 | Dolsey | |
| 8,329,616 | B2 | 12/2012 | Majumdar | |
| 8,609,787 | B2 | 12/2013 | Hansen | |
| 8,614,281 | B2 | 12/2013 | Hansen | |
| 10,245,705 | B2 * | 4/2019 | Graham | B24D 11/001 |
| 2009/0000727 | A1 * | 1/2009 | Kumar | C09J 7/401 156/763 |
| 2009/0035519 | A1 | 2/2009 | Gaeta | |
| 2011/0021114 | A1 * | 1/2011 | McArdle | B24B 37/245 451/8 |
| 2011/0314746 | A1 | 12/2011 | Erickson | |
| 2012/0231707 | A1 | 9/2012 | Pahl | |
| 2013/0004749 | A1 * | 1/2013 | Hao | B32B 29/00 428/206 |
| 2013/0184394 | A1 | 7/2013 | Satrijo | |
| 2015/0184038 | A1 * | 7/2015 | Schaner | B44C 1/1758 525/123 |
| 2015/0190902 | A1 * | 7/2015 | Woo | C09K 3/1436 451/527 |
| 2016/0136787 | A1 | 5/2016 | Bajaj | |
| 2016/0289514 | A1 | 10/2016 | Kurian | |
| 2017/0043450 | A1 | 2/2017 | Graham | |
| 2017/0304996 | A1 * | 10/2017 | Graham | B24D 11/02 |

FOREIGN PATENT DOCUMENTS

| | | |
|---|---|---|
| WO | WO 2009-005975 | 1/2009 |
| WO | WO 2010-002562 | 1/2010 |
| WO | WO 2016-073227 | 5/2016 |
| WO | WO 2016-209651 | 12/2016 |
| WO | WO 2017-117364 | 7/2017 |

* cited by examiner

FLEXIBLE ABRASIVE ARTICLE WITH IMAGE LAYER

BACKGROUND

Sandpaper is widely sold in home improvement and hardware stores for household sanding applications. Common household substrates to be sanded include, for example, moldings, raised panels, carvings, and flutings. It is common practice for users to fold and/or wrap the sandpaper around their finger tip for greater control and ability to get into tight spots. However, such practices may be less than ideal due to the stiffness of typical paper-backed sandpaper; indeed, the sandpaper may crack thereby causing reduced product life.

SUMMARY

The present inventors have overcome the above-mentioned deficiencies by making an abrasive article that includes a flexible and durable backing comprising polyurethane in one embodiment. However, manufacturers of flexible abrasive articles need to place product information onto the flexible abrasive article in an image layer to convey information such as abrasive grit size, manufacturer, safety warnings, or other desirable graphics. The information in the image layer is typically located on the exposed backing layer of such products opposite the abrasive layer. Often the backing layer is suitably pre-printed in another process prior to application of the abrasive layer.

The physical properties of polyurethane, while having great conformability in use, often means that an additional support layer is needed during the manufacturing process to provide integrity during the steps of applying the make coat, applying the abrasive particle layer, curing the make coat, applying the size coat, and curing the size coat. However, the additional support layer prevents the back surface of the flexible backing layer to be printed in the same way as the paper backed products because the support layer interferes with proper placement of the image layer prior to application of the abrasive layer. Therefore, what is needed is a removable support layer that can be printed with inks to form an image layer and then transfer the image layer to the flexible backing upon removal of the support layer.

Hence in one aspect the invention resides in a method including the steps of: providing a removable support sheet having a first major support surface; printing an image layer comprising inks onto the first major surface; extruding a backing layer onto the image layer forming a first major backing surface over the image layer and a second major backing surface opposite the first major backing surface; applying a functional layer onto the second major backing surface; and separating the removable support sheet from the backing layer while leaving the image layer attached to the first major backing surface.

In another aspect the invention is an article having: a removable support sheet having a first major surface; an image layer comprising inks applied over the first major surface; a polyurethane backing layer having a first major backing surface located adjacent to the image layer and a second major backing surface opposite the first major surface; and a functional layer comprising an abrasive layer applied to the second major surface; the abrasive layer comprising a make coat, abrasive particles and a size coat.

Figure 1:
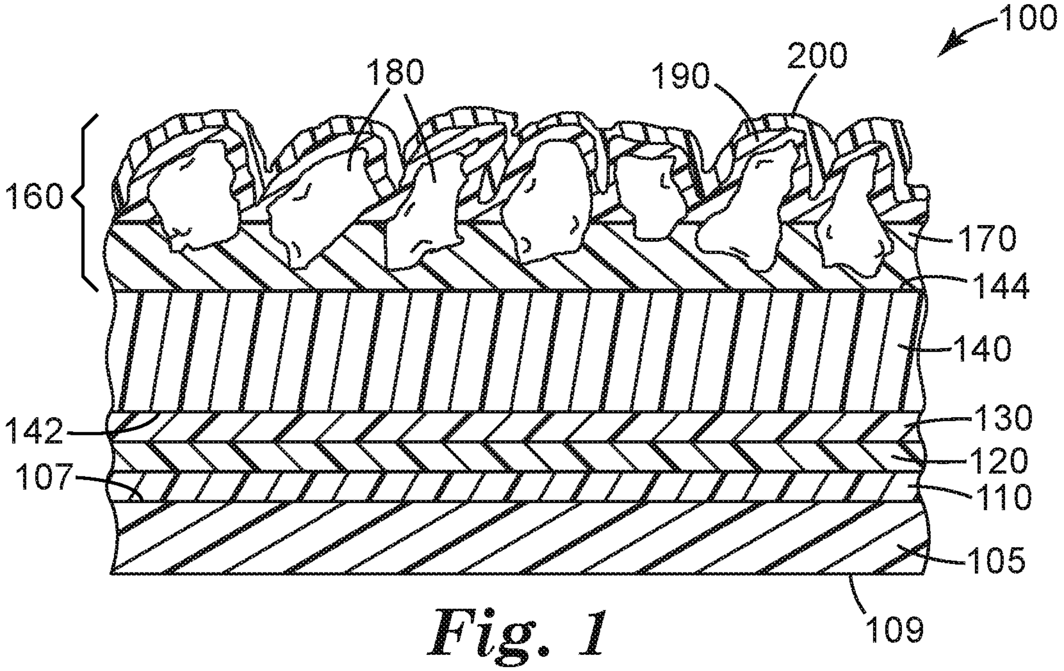
FIG. 1 is a side view of one embodiment of a flexible abrasive article 100 having a removable support layer 105 according to the present disclosure.

The various layers in the figures are not drawn to scale to enhance understanding.

DETAILED DESCRIPTION

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

Referring now to FIG. 1, a flexible abrasive article 100 comprises a removable support layer 105, an optional first coat layer 110, an image layer 120, an optional top coat layer 130, a flexible backing layer 140 and an optional functional layer such as an abrasive layer 160. Each of these layers will be described in detail under separate headings later.

A typical manufacturing process would start by unwinding the removable support layer 105, having a first major surface 107 and an opposing second major surface 109 and optionally coating a first major surface 107 of the removable support layer with the first coat layer 110. The optional first coat layer 110 can be used to either enhance the bonding of the image layer 120, assist in easier removal of the support layer 105 or perform both functions. Next an image layer 120 is either applied directly onto the first major surface 107 or onto the first coat layer 110 by using printing inks and a suitable graphics printing method. An optional top coat layer 130 can then be applied over the image layer 120. The optional top coat layer 130 can be used to protect the image layer from damage during further processing steps, level the height of the image layer by filling in and leveling the image layer such that areas where there is printing are the same height as areas where there is not printing to smooth application of the flexible backing layer 140, or to enhance bonding of the flexible backing layer. Prior to application of the flexible backing layer 140, layer(s) 110, 120, and/or 130 are typically cured and/or dried as needed prior to application of the next layer.

Figure 2:
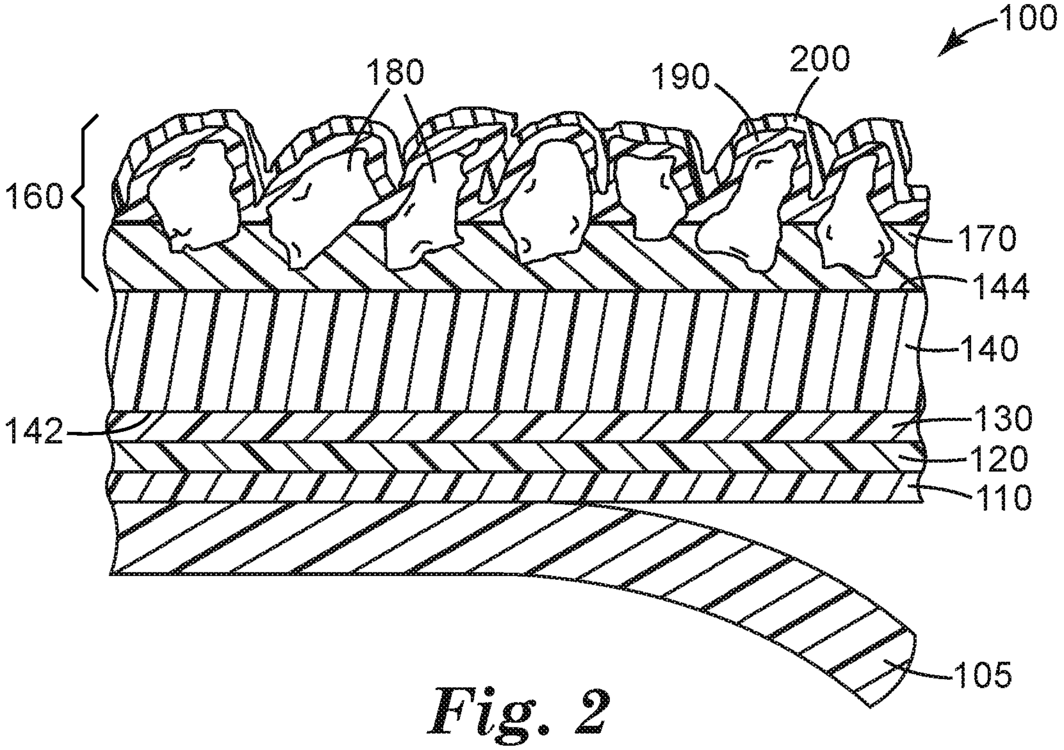
FIG. 2 is a side view of FIG. 1 with the support layer partially removed from the flexible abrasive article thereby transferring the image layer 120 to the flexible abrasive article 100.

Next the flexible backing layer 140 can be extruded onto either the optional top coat layer 130 or the image layer 120 and at least partially cured prior to winding the multi-layer web into a roll. The preceding steps may be carried out on a single manufacturing line or broken into multiple steps as needed. In one embodiment, the multi-layer wound roll is then placed into an unwind stand of an abrasive article maker where it is unwound and a make coat and abrasive particles are applied to the exposed surface of the flexible backing layer and the make coat at least particularly cured. Then a size coat is applied and at least partially cured. Either prior to winding the coated abrasive article into a roll or in an offline operation, the removable support layer 105 is separated from the flexible backing layer 140 and threaded along a separate web path and wound into a separate roll while the coated abrasive article is being wound into another roll or processed through converting equipment in a conventional manner. While the removable support layer 105 is being stripped off the multi-layer web, the image layer 120 originally applied to the removable support layer is transferred to and stays with the flexible backing layer 140 as seen in FIG. 2. Further converting steps can be carried out to cut the coated abrasive article into sheets or discs and apply other coatings or materials to either the abrasive layer or the flexible backing layer 140 with the image layer 120 as known to those of skill in the art. Examples of such additional coatings or layers include: adhesives such as pressure sensitive adhesives, woven fabric layers that provide loops that provide releasable attachment to complementary accessories with hook layers, and friction modifying surfaces such as those disclosed in WO2016209651 herein incorporated by reference.

Removable Support Layer

The removable support layer 105 can be any film that can provide dimensional stability during a coating step and any subsequent processing steps. In some preferred embodiments, removable support layer is 105 is a 0.002" thick film of polyethylene terephthalate (PET). In other embodiments, the support film can be polypropylene, polyethylene, polybutylene terephthalate, polyamides (such as nylon 6,6), or polyacetals. In other embodiments, the first major surface 107 of the removable support film may be treated with an electrical discharge treatment or other surface treatment in order to modify its surface energy or modulate the adhesion to the ink for the image layer. In some embodiments, the thickness of the removable support layer may range from about 0.0005" to about 0.020", or from about 0.001" to about 0.010", or from about 0.001" to about 0.005". In some embodiments, the removable support layer may be a two-layer film or multi-layer film. In such embodiments, one such layer may be paper and the other layer may be one of the polymers listed above.

Optional First Coat Layer

The optional first coat layer can be a release coating or a primer coating. In some embodiments, the optional first coat layer stays adhered to the removable support layer and is removed with the support layer and in other embodiments the optional first coat layer remains attached to the image layer and the flexible substrate when the support layer is removed.

In one embodiment, the optional first coat layer 110 is a temporary coating that provides a surface suitable for proper wetting of the applied ink in the image layer. The optional first coat layer can provide adequate ink adhesion for the flexible backing coating step, and thereafter provides release of the ink image layer when it is ultimately separated from the removable support film.

The optional first coat layer may by a release coating that is formulated to provide facile release from pressure sensitive adhesive coatings. In such embodiments, the release coating remains on the removable support film as it is released from the flexible backing layer. In some preferred embodiments, the release coating comprises compositions that are based on octyldecyl acrylate.

The release coating for the first coat layer may be applied to either the first major surface 107 of the removable support layer 105 or to the second major surface 109 of the removable support layer or to both surfaces. When the optional release coating is applied to the second major surface 109, it can prevent blocking of the image layer to the back surface of the film when the multi-layer material is wound into a roll. In cases where the release coating is applied to first major surface 107, it can facilitate the release of the removable support film from the flexible backing layer 140, such as, for example, a polyurethane surface.

In another embodiment, the optional first coat layer comprises a polymeric material. Suitable polymeric materials are made from resins that include but not limited to homopolymers and copolymers containing: polyacrylates, polyesters, polyethers, polyvinyl acetates, polyvinyl alcohols, polyvinyl chlorides, polyolefins, polycarbonates, natural or synthetic rubbers, and polyurethanes. The polyurethanes include aliphatic and aromatic polyurethanes that may contain, water, solvent, or be 100% solids. More specifically, the polyurethane resin may comprise a polycarbonate polyurethane, a polyester polyurethane or polyether polyurethane. In some preferred embodiments, the optional first coat layer comprises SU-22-196 or SU-96-603, or blends thereof, both of which are solvent based aliphatic polycarbonate-polyurethane solutions available from Stahl.

In some preferred embodiments, the optional first coat layer comprises QC4830 or QA3781, or blends thereof, both of which are solvent born coatings available from Chase Corporation (Westwood, MA). In some preferred embodiments, the optional first coat layer comprises solutions polyurethane resins, such as Estane 5715 and Estane 5714, both of which are available from Lubrizol.

The optional first coat layer may be applied using any common coating technique. In some preferred embodiments, the optional first coat layer is applied via gravure coating. In some preferred embodiments, the optional first coat layer is applied by Mayer rod coating, slot die coating, flexography, knife-over-roll coating, spray coating, or hot melt coating.

In some embodiments, the thickness of the optional first coat layer can range from about one micrometer to about 75 micrometers. In other embodiments, the thickness of the first coat layer can range from about one micrometer to about 25 micrometers. In still other embodiments the thickness of the first coat layer can range from one micrometer to about 5 micrometers.

In cases where the optional first coating layer is formulated to release from the removable support layer, the adhesion of the optional first coating layer to the image layer and the flexible backing layer should be higher than the adhesion to the removable support layer. In some embodiments, the peel adhesion of the optional first coat layer to the image layer and the flexible backing layer should both be at least double the peel adhesion of the optional first coating layer to the removable support layer.

In embodiments where there is not an optional top coat layer, the optional first coat layer is preferably selected so that it does not block to the back surface (the side that is opposite the first coating layer) when the web is wound into a roll.

Image Layer

There are a wide variety of inks and imaging methods that can be used to apply inks in a pattern forming the image layer 120. In some preferred embodiments, the inks are the Flexomax-branded inks that are available from Sun Chemical Co. In other embodiments, the inks are the SL-800 series inks, also available from Sun Chemical Co. In some preferred embodiments, the image layer is applied via a flexographic printing process or a gravure printing process. In some preferred embodiments, the image layer is applied via inkjet, offset lithography.

Optional Top Coat Layer

The optional topcoat layer 130 desirably has adequate adhesion to the image layer 120. In preferred embodiments, the topcoat enables proper roll formation and unwind properties by providing suitable release from the back surface of removable support layer 100. The materials for the optional top coat layer can be the same as those used for the optional first coat layer and similar application methods can be used.

In many embodiments, the materials that are selected for the optional top coat layer are the same as those which can be selected for the optional first coat layer. However, the requirements of the optional top coat layer can be different from the requirements of the optional first coat layer. The optional top coat layer needs to be selected such that it adheres to both the image layer and the optional first coating layer. Also, the optional top coating layer needs to be selected such that it does not block to the back surface of the removable support layer. Also, in some embodiments, the optional top coat layer may need to be selected to be sufficiently optically transparent to allow the image layer to be properly viewed.

The optional top coat layer may be applied using any common coating technique. In some preferred embodiments, the optional top coat layer is applied via gravure coating. In some preferred embodiments, the optional top coat layer is applied by Mayer rod coating, slot die coating, flexography, knife-over-roll coating, spray coating, or hot melt coating.

In some embodiments, the thickness of the optional top coat layer can range from about one micrometer to about 75 micrometers. In other embodiments, the thickness of the top coat layer can range from about one micrometer to about 25 micrometers. In still other embodiments the thickness of the top coat layer can range from one micrometer to about 5 micrometers.

Flexible Backing Layer

The flexible backing layer 140 has a first major surface 142 and an opposing a second major surfaces 144. The first major surface is in contact with either the image layer 120 or the optional top coat layer 130. The second major surface supports or has applied to it a functional layer as described later. The flexible backing layer may have a number of physical properties that collectively impart flexibility and durability to the flexible abrasive article.

In one embodiment, the flexible backing layer may have an average thickness of 0.5 to 8 mils (12 to 200 microns), preferably 1 to 6 mils (25 to 150 microns), and more preferably 1 to 5 mils (25 to 125 microns). In this embodiment, the flexible backing layer may have a tensile strength in the range of from 500 to 3200 psi (3.4 to 22.1 MPa), preferably 1000 to 2500 psi (6.9 to 17.2 MPa), more preferably 1600 to 2100 psi (11.0 to 14.5 MPa), and an ultimate elongation (i.e., elongation at break) of 230 to 530 percent, preferably 300 to 460 percent, and more preferably 350 to 410 percent.

The flexible backing layer may be unitary; that is, it may consist of a single layer, although in certain embodiments it may be a composite flexible backing layer, if desired. Typically, the flexible backing layer is at least substantially homogeneous, although this is not a requirement. The flexible backing layer may be perforated; however, if perforated, the average thickness is not determined using areas of the perforations where the thickness would, of course, be zero as no flexible backing layer is present there. Preferably, the flexible backing layer is impermeable to liquid water and substantially free of void space, although minor amounts of porosity may be acceptable. For example, the flexible backing layer may have less than 10 percent, less than 2 percent, less than 1 percent, or even less than 0.01 percent of intrinsic voids (i.e., voids that are not deliberately added, but are an intrinsic property of the material making up the flexible backing layer), based on the total volume of the flexible backing layer.

The flexible backing layer may comprise one or more polyurethanes. Preferably, the polyurethane comprises, or at least consists essentially of, at least one thermoplastic polyurethane (TPU). The term "consisting essentially of" as used in this context means that additive compounds (e.g., fragrances, colorants, antioxidants, UV light stabilizers, and/or fillers) may be present in the flexible backing layer as long as tensile strength and ultimate elongation remains substantially unaffected by their presence. For example, the additives may have less than a 5 percent, preferably less than 1 percent, effect on tensile strength and ultimate elongation.

In some embodiments, the flexible backing layer may comprise a single thermoplastic polyurethane or a combination of thermoplastic polyurethanes. One preferred class of polyurethanes is aromatic polyether-based polyurethanes, preferably thermoplastic polyether-based polyurethanes. In some embodiments, the thermoplastic polyether-bases polyurethanes are derived from 4,4'-methylenedicyclohexyl diisocyanate (MDI), a polyether polyol, and butanediol.

Thermoplastic polyurethanes are well known and can be made according to many known techniques, or they may be obtained for commercial suppliers. For example, Lubrizol Corp., Cleveland, Ohio, is one commercial supplier of various thermoplastic polyurethanes such as, for example: polyester-based aromatic TPUs available under the trade designation "ESTANE GP TPU (B series)" (e.g., grades 52

DB, 55 DB, 60 DB, 72 DB, 80 AB, 85 AB, and 95 AB); and polyester and polyether based TPUs available under the trade designation "ESTANE 58000 TPU series" (e.g., grades 58070, 58091, 58123, 58130, 58133, 58134, 58137, 58142, 58144, 58201, 58202, 58206, 58211, 58212, 58213, 58215, 58219, 58226, 58237, 58238, 58244, 58245, 58246, 58248, 58252, 58271, 58277, 58280, 58284, 58300, 58309, 58311, 58315, 58325, 58370, 58437, 58610, 58630, 58810, 58863, 58881, and 58887).

The flexible backing layer may comprise polyolefin materials such as polyethylene, polyolefin copolymers such as polyethylene-co-acrylic acid, natural rubber, synthetic rubber, polyvinyl chloride. The flexible backing layer may be cast (e.g., from solvent or water) or extruded. It may contain one or more additives such as fillers, melt processing aids, antioxidants, flame retardants, colorants, or ultraviolet light stabilizers.

Optional Functional Layer

In some embodiments, an optional functional layer is applied to the second major surface 144 of the flexible backing layer. The functional layer can be selected to provide abrading, protection (see for example WO 2009/005975), light modification (see for example WO 2010/002562 or WO 2006/098899), release (see for example U.S. Pat. No. 8,614,281 or U.S. Pat. No. 8,609,787), adhesion (see for example US20160289514 or US20130184394), or other suitable property. All preceding patents, patent publications or their US equivalent patent publication or US equivalent granted patent herein incorporated by reference. For example, the functional layer can be an abrasive layer, a hard coat layer so that the multilayer web can be a protective film for automobile body panels, an optically active coating so that multilayer web can function like a mirror or an optical filter, an adhesion promoting layer, a pressure-sensitive adhesive layer, or an anti-wetting/anti-fogging layer.

In one embodiment, the optional functional layer comprised an abrasive layer 160 disposed on and secured to second major surface 144 of the flexible backing layer 140. Abrasive layer 160 comprises make layer 170, abrasive particles 180, and a size layer 190 which is disposed on make layer 170 and abrasive particles 180. An optional supersize layer 200 is disposed on size layer 190. Abrasive layer 160 is disposed on and secured to second major surface 144 of the flexible backing layer.

The make and size layers can be prepared by curing a respective make or size layer precursor. The make and size layer precursors may have the same or different compositions, and may be applied at the same or different coat weights.

The make and size layer comprise at least one polyepoxide and at least one polyfunctional (meth)acrylate, a curative (e.g., polyamine, polythiol, acid catalyst, or photocatalyst) for the polyepoxide and a free-radical initiator (photoinitiator and/or thermal initiator). Monofunctional epoxides and polyols (e.g., diols used as chain extenders) may also be used in combination with the polyepoxide(s).

Useful polyepoxides may be aromatic or aliphatic polyepoxide(s), or a combination thereof. Useful polyepoxides may be liquid or solid, but are typically liquid for ease of handling. Whether liquid or solid, the polyepoxide(s) should generally be selected such that it can be dissolved in the precursor composition (e.g., make or size layer precursor composition). In some instances, heating may be useful to facilitate dissolution of the polyepoxide.

Examples of aromatic polyepoxides include: polyglycidyl ethers of polyhydric phenols such as bisphenol A diglycidyl ether (commonly referred to in the art as DGEBA) and commercially available bisphenol A-derived and bisphenol F-derived epoxy resins having the trade designation "EPON" (for example, EPON RESIN 825, EPON RESIN 828, EPON RESIN 1001F, EPON RESIN 1002F, EPON RESIN 1004F, EPON RESIN 1007F, and EPON RESIN 1009F), marketed by Hexion Specialty Chemicals, Columbus, Ohio, and bisphenol A-derived epoxy resins having the trade designation "DER" (for example, DER 332, DER 337, DER 362, and DER 364), marketed by Dow Chemical Company, Midland, Michigan; epoxy cresol-novolac resins; epoxy phenol-novolac resins; and glycidyl esters of aromatic carboxylic acids (e.g., phthalic acid diglycidyl ester, isophthalic acid diglycidyl ester, trimellitic acid triglycidyl ester, and pyromellitic acid tetraglycidyl ester), and combinations thereof.

Examples of useful aliphatic polyepoxides include epoxycyclohexanecarboxylates (e.g., 3,4-epoxycyclohexylmethyl 3,4-epoxycyclohexanecarboxylate (e.g., as available as ERL-4221 from Dow Chemical Co.); 3,4-epoxy-2-methylcyclohexylmethyl 3,4-epoxy-2-methylcyclohexanecarboxylate; bis(3,4-epoxy-6-methylcyclohexylmethyl) adipate; 3,4-epoxy-6-methylcyclohexylmethyl 3,4-epoxy-6-methylcyclohexanecarboxylate (e.g., as available as ERL-4201 from Dow Chemical Co.); vinylcyclohexene dioxide (e.g., as available as ERL-4206 from Dow Chemical Co.); bis(2,3-epoxycyclopentyl) ether (e.g., as available as ERL-0400 from Dow Chemical Co.); bis(3,4-epoxy-6-methylcyclohexylmethyl) adipate (e.g., as available as ERL-4289 from Dow Chemical Co.); dipenteric dioxide (e.g., as available as ERL-4269 from Dow Chemical Co.); 2-(3,4-epoxycyclohexyl-5,1'-spiro-3',4'-epoxycyclohexane-1,3-dioxane; and 2,2-bis(3,4-epoxycyclohexyl)propane.

The amount of polyepoxide present in the make layer precursor typically ranges from about 40 to 70 percent by weight, preferably 50 to 60 percent by weight, based on the total weight of solids (i.e., nonvolatile components) in the make layer precursor, although amounts outside this range may also be used.

Useful polyfunctional (meth)acrylates may be liquid or solid, but are typically liquid for ease of handling. Whether liquid or solid, the polyfunctional (meth)acrylates should generally be selected such that it can be dissolved in the precursor composition. In some instances, heating may be useful to facilitate dissolution of the polyfunctional (meth) acrylate. Exemplary useful polyfunctional (meth)acrylates include (meth)acrylate monomers, (meth)acrylate oligomers, (meth)acrylated polymers, and combinations thereof.

A wide variety of polyfunctional (meth)acrylate(s) are readily commercially available; for example, from such vendors as Sartomer Co., Exton, Pennsylvania, and UCB Chemicals Corp., Smyrna, Georgia.

Exemplary polyfunctional (meth)acrylate(s) include ethylene glycol di(meth)acrylate, hexanediol di(meth)acrylate, triethylene glycol di(meth)acrylate and methacrylate, trimethylolpropane tri(meth)acrylate, glycerol tri(meth)acrylate, pentaerythritol tri(meth)acrylate and methacrylate, ethoxylated trimethylolpropane tri(meth)acrylate and trimethacrylate, neopentyl glycol di(meth)acrylate and dimethacrylate, pentaerythritol tetra(meth)acrylate and tetramethacrylate, dipentaerythritol penta(meth)acrylate, sorbitol tri(meth) acrylate, sorbitol hexa(meth)acrylate, Bisphenol A di(meth) acrylate, ethoxylated Bisphenol A di(meth)acrylate, and mixtures thereof.

Example of useful polyfunctional (meth)acrylate monomers include trimethylolpropane triacrylate, available, for example, from Sartomer Co. as SR 351; ethoxylated trimethylolpropane triacrylate, available, for example, from Sartomer Co. as SR 454; pentaerythritol tetraacrylate, available, for example, from Sartomer Co. as SR 295; and neopentyl glycol diacrylate, available, for example, from Sartomer Co. as SR 247.

The polyfunctional acrylate may comprise at least one (meth)acrylate oligomer. Exemplary (meth)acrylate oligomers include (meth)acrylated epoxy oligomers (e.g., Bisphenol-A based epoxy (meth)acrylate oligomers), aliphatic urethane (meth)acrylate oligomers, and aromatic urethane (meth)acrylate oligomers. Additional useful polyfunctional (meth)acrylate oligomers include polyether oligomers such as a polyethylene glycol 200 diacrylate, available, for example, from Sartomer Co. as SR 259 and a polyethylene glycol 400 diacrylate available from Sartomer Co. as SR 344; and acrylated epoxies including those available as EBECRYL 3500, EBECRYL 3600, and EBECRYL 3700, from UCB Chemicals Corp.

In some preferred embodiments, the polyfunctional (meth)acrylate, whether present as a blend of polymerizable (meth)acrylates or as a single component, has an average (meth)acryloxy group functionality of at least 2.2., at least 2.5, or even at least 3.

The amount of polyfunctional (meth)acrylate(s) present in the make layer precursor typically ranges from about 5 to about 20 percent by weight, preferably from about 5 to about 15 percent by weight, and even more desirably from about 8 to about 12 percent by weight, based on the total weight of solids (i.e., nonvolatile components) in the make layer precursor, although amounts outside this range may also be used.

The make and size layer precursors may further comprise an optional bireactive polymerizable component, for example, a compound having at least one free-radically polymerizable group, and at least one cationically polymerizable group. Bireactive compounds can be made, for example, by introducing at least one ethylenically-unsaturated group into a compound that already contains one or more epoxy groups, or, conversely, by introducing at least one epoxy group into a compound that already contains one or more ethylenically-unsaturated group.

Exemplary bireactive polymerizable compounds include those contained in the reaction products of 0.4 to 0.6 weight equivalent of an acrylic acid and one mole of diglycidyl ether of Bisphenol A, polyglycidyl ether of phenol-formaldehyde novolac, polyglycidyl ether of cresol-formaldehyde novolac, diglycidyl terephthalate, triglycidyl ester of trimellitic acid, dicyclopentadiene dioxide, vinylcyclohexene dioxide, bis(2,3-epoxycyclopentyl)ether, 3,4-epoxycyclohexylmethyl 3,4-epoxycyclohexanecarboxylate, and bis(3,4-epoxy-6-methylcyclohexyl)methyl adipate.

If used, optional bireactive materials are desirably selected such that they do not significantly inhibit the cure of cationically polymerizable resin. Exemplary groups that may interfere with such cure include primary, secondary and tertiary amines, amides, and imides.

The make and size layer precursor typically contain an effective amount of curative for the polyepoxide curative (e.g., a polyamine or a Lewis acid catalyst) and free-radical polymerization initiator (preferably a free-radical photoinitiator) for the polyfunctional (meth)acrylate; however, depending on curing conditions this is not a requirement.

Suitable curative(s) include those that are photosensitive and/or thermally-sensitive, and desirably comprise at least one free-radical polymerization initiator and at least one cationic polymerization catalyst, which may be the same or different. In order to minimize heating during cure while preserving pot-life of the make and/or size layer precursors, the precursors are preferably photocurable and comprise a photoinitiator and/or a photocatalyst.

"Photocatalysts" as defined herein are materials that form active species that, if exposed to actinic radiation, are capable of at least partially polymerizing polyepoxides employed in practice of the present disclosure. Optionally, the binder precursor may comprise at least one photocatalyst (e.g., an onium salt and/or cationic organometallic salt).

Desirably, onium salt photocatalysts comprise iodonium complex salts and/or sulfonium complex salts. Useful aromatic onium complex salts are further described, for example, in U.S. Pat. No. 4,256,828 (Smith). Exemplary aromatic iodonium complex salts include diaryliodonium hexafluorophosphate or a diaryliodonium hexafluoroantimonate. Exemplary aromatic sulfonium complex salts include as triphenylsulfonium hexafluoroantimonate and p-phenyl(thiophenyl)diphenylsulfonium hexafluoroantimonate.

Aromatic onium salts, useful in practice of the present disclosure, are typically photosensitive only in the ultraviolet region of the spectrum; however, they can be sensitized to the near ultraviolet and the visible range of the spectrum by sensitizers for known photolyzable organic halogen compounds. Exemplary sensitizers include aromatic amines and colored aromatic polycyclic hydrocarbons, as described, for example, in U.S. Pat. No. 4,250,053 (Smith).

Suitable photoactivatable organometallic complex salts useful in the present disclosure include those described, for example, in U.S. Pat. No. 5,059,701 (Keipert); U.S. Pat. No. 4,751,138 (Tumey); U.S. Pat. No. 4,985,340 (Palazzotto); U.S. Pat. No. 5,191,101 (Palazzotto et al.); and 5,252,694 (Willett et al.).

Exemplary organometallic complex cations useful as photoactivatable catalysts include:

(η6-benzene)(η5-cyclopentadienyl) $Fe^+SbF_6^-$,
(η6-toluene)(η5-cyclopentadienyl)$Fe^+SbF_6^-$,
(η-xylene)(η5-cyclopentadienyl)$Fe^+SbF_6^-$,
(η6-cumene)(η5-cyclopentadienyl)$Fe^+PF_6^-$,
(η6-xylenes (mixed isomers))(η5-cyclopentadienyl)$Fe^+SbF_6^-$,
(η6-xylenes (mixed isomers))(η5-cyclopentadienyl)$Fe^+PF_6^-$,
(η6-o-xylene)(η5-cyclopentadienyl)$Fe^+CF_3SO_3^-$,
($\eta^6$-m-xylene)($\eta^5$-cyclopentadienyl)$Fe^+BF_4^-$,
($\eta^6$-mesitylene)($\eta^5$-cyclopentadienyl)$Fe^+SbF_6^-$,
($\eta^6$-hexamethylbenzene)($\eta^5$-cyclopentadienyl)$Fe^+SbF_5OH^-$, and
$\eta^6$-fluorene)($\eta^5$-cyclopentadienyl)$Fe^+SbF_6^-$.

Optionally, organometallic salt initiators can be accompanied by an accelerator such as an oxalate ester of a tertiary alcohol. If present, the accelerator desirably comprises from about 0.1 to about 4 percent by weight of the total binder precursor, more desirably about 60 percent of the weight of the organometallic salt initiator.

Useful commercially available photocatalysts include an aromatic sulfonium complex salt available as UVI-6974 from Dow Chemical Co.

Useful free-radical photoinitiators include, for example, those known as useful for photocuring free-radically polyfunctional acrylates. Exemplary photoinitiators include benzoin and its derivatives such as α-methylbenzoin; α-phenylbenzoin; α-allylbenzoin; α-benzylbenzoin; benzoin ethers such as benzil dimethyl ketal; benzoin methyl ether; benzoin ethyl ether; benzoin n-butyl ether; acetophenone and its derivatives such as 2-hydroxy-2-methyl-1-phenyl-1-propanone and 1-hydroxycyclohexyl phenyl ketone;

2-methyl-1-[4-(methylthio)phenyl]-2-(4-morpholinyl)-1-propanone; 2-benzyl-2-(dimethlamino)-1-[4-(4-morpholinyl)phenyl]-1-butanone; pivaloin ethyl ether; anisoin ethyl ether; anthraquinones such as anthraquinone, e.g., 2-ethylanthraquinone; 1-chloroanthraquinone; 1,4-dimethylanthraquinone; 1-methoxyanthraquinone; benzanthraquinonehalomethyltriazines; benzophenone and its derivatives; diaryliodonium salts and triarylsulfonium salts; titanium complexes such as bis($\eta^5$-2,4-cyclopentadien-1-yl)bis[2,6-difluoro-3-(1H-pyrrol-1-yl)phenyl]titanium, halomethylnitrobenzenes; mono- and bis-acylphosphines; and combinations thereof.

Photoinitiators and photocatalysts useful in the present disclosure can be present in an affect amount, generally in the range of 0.01 to 10 weight percent, more typically 0.01 to 5, or even 0.1 to 2 weight percent, based on the total solids of the make and size/layer precursors amount of photocurable (i.e., crosslinkable by electromagnetic radiation) components of the binder precursor, although amounts outside of these ranges may also be useful.

Optionally, thermal curative may be included in the binder precursor. Desirably, such thermal curative is thermally stable at temperatures at which mixing of the components takes place. Exemplary thermal curatives for epoxy resins and acrylates are well known in the art, and are described, for example, in U.S. Pat. No. 6,258,138 (DeVoe et al.). Thermal curative may be present in the make and/or size layer precursors in any effective amount. Such amounts are typically in the range of about 0.01 parts to 5 parts, desirably in the range from about 0.025 to 2 parts by weight, based on the total solids of the make and size/layer precursors, although amounts outside of these ranges may also be useful.

The make, size, and optional supersize layer precursors used to make flexible abrasive articles according to the present disclosure may optionally contain additional curable components such as, for example, phenolic resins (novolac or resole), aminoplasts, cyanate resins, isocyanate resins, and/or alkyd resins.

In addition to other components, the make, size, and optional supersize layers, of flexible abrasive articles according to the present disclosure may contain optional additives, for example, to modify performance and/or appearance. Exemplary optional additives include grinding aids, fillers, plasticizers, wetting agents, surfactants, pigments, coupling agents, fibers, lubricants, thixotropic materials, antistatic agents, suspending agents, pigments, and dyes.

Exemplary grinding aids, which may be organic or inorganic, include waxes, halogenated organic compounds such as chlorinated waxes like tetrachloronaphthalene, pentachloronaphthalene, and polyvinyl chloride; halide salts such as sodium chloride, potassium cryolite, sodium cryolite, ammonium cryolite, potassium tetrafluoroborate, sodium tetrafluoroborate, silicon fluorides, potassium chloride, magnesium chloride; and metals and their alloys such as tin, lead, bismuth, cobalt, antimony, cadmium, iron, and titanium; and the like. Examples of other grinding aids include sulfur, organic sulfur compounds, graphite, and metallic sulfides. A combination of different grinding aids can be used such as that described, for example, in U.S. Pat. No. 5,552,225 (Ho).

The basis weight of the make layer (i.e., after curing) may depend, for example, on the intended use(s), type(s) of abrasive particles, and nature of the coated abrasive article being prepared, but generally will be in the range of from about 1 to about 30 grams per square meter (i.e., gsm), preferably from about 10 to about 25 gsm, and more desirably from about 10 to about 20 gsm.

The make layer can be formed by coating the make layer precursor on a major surface of the flexible backing layer. The make layer precursor may be applied, for example, by any known coating method for applying a make layer to a flexible backing layer including, for example, roll coating, extrusion die coating, curtain coating, knife coating, gravure coating, and spray coating.

After the make layer precursor is applied to the flexible backing layer, but before the size layer precursor is applied, the abrasive particles can be applied to make layer precursor and then the make layer precursor can be optionally partially cured (e.g., to an a-stage or b-stage).

Abrasive particles suitable for use in abrasive layers utilized in practice of the present disclosure include any abrasive particles known in the abrasive art. Exemplary useful abrasive particles include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and blends thereof. Desirably, the abrasive particles comprise fused aluminum oxide, heat-treated aluminum oxide, ceramic aluminum oxide, silicon carbide, alumina zirconia, garnet, diamond, cubic boron nitride, sol-gel derived abrasive particles, or mixtures thereof. Examples of sol-gel abrasive particles include those described U.S. Pat. No. 4,314,827 (Leitheiser et al.); 4,518,397 (Leitheiser et al.); 4,623,364 (Cottringer et al.); 4,744,802 (Schwabel); U.S. Pat. No. 4,770,671 (Monroe et al.); 4,881,951 (Wood et al.); 5,011,508 (Wald et al.); 5,090,968 (Pellow); U.S. Pat. No. 5,139,978 (Wood); U.S. Pat. No. 5,201,916 (Berg et al.); 5,227,104 (Bauer); U.S. Pat. No. 5,366,523 (Rowenhorst et al.); 5,429,647 (Laramie); U.S. Pat. No. 5,498,269 (Larmie); and 5,551,963 (Larmie).

The abrasive particles may be in the form of, for example, individual particles, agglomerates, abrasive composite particles, alpha alumina abrasive shards, and mixtures thereof. Exemplary agglomerates are described, for example, in U.S. Pat. No. 4,652,275 (Bloecher et al.) and 4,799,939 (Bloecher et al.). It is also within the scope of the present disclosure to use diluent erodible agglomerate grains as described, for example, in U.S. Pat. No. 5,078,753 (Broberg et al.). Abrasive composite particles comprise abrasive grains in a binder. Exemplary abrasive composite particles are described, for example, in U.S. Pat. No. 5,549,962 (Holmes et al.). Alpha alumina abrasive shards are described in U.S. Pat. Appln. Publ. 2011/0314746 A1 (Erickson et al.).

The abrasive particles typically have an average diameter of from about 0.1 to about 2000 micrometers, more desirably from about 1 to about 1300 micrometers. Abrasive particles are generally graded to a given particle size distribution before use. Such distributions typically have a range of particle sizes, from coarse particles to fine particles. In the abrasive art this range is sometimes referred to as a "coarse", "control", and "fine" fractions.

Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000. For use in hand sanding applications such as wood trim and moldings (painted or unpainted) with shaped three-dimensional surfaces, the abrasive particles have a size distribution falling within the range of ANSI grades P100 to P320, inclusive.

Alternatively, the abrasive particles can be graded to a nominal screened grade using U.S.A. Standard Test Sieves conforming to ASTM E-11 "Standard Specification for Wire Cloth and Sieves for Testing Purposes". ASTM E-11 proscribes the requirements for the design and construction of testing sieves using a medium of woven wire cloth mounted in a frame for the classification of materials according to a designated particle size. A typical designation may be represented as −18+20 meaning that abrasive particles pass through a test sieve meeting ASTM E-11 specifications for the number 18 sieve and are retained on a test sieve meeting ASTM E-11 specifications for the number 20 sieve. In certain embodiments, the abrasive particles have a particle size such that most of the abrasive particle pass through an 18 mesh test sieve and can be retained on a 20, 25, 30, 35, 40, 45, or 50 mesh test sieve. In various embodiments of the present disclosure, the abrasive particles can have a nominal screened grade comprising: −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635.

Coating weights for the abrasive particles may depend, for example, on the binder precursor used, the process for applying the abrasive particles, and the size of the abrasive particles, but typically range from about 5 to about 250 grams per square meter (gsm), preferably from 20 to 100 gsm, more preferably 30 to 80 gsm, and more preferably 45 to 65 gsm; although other amounts may also be used.

Next, the size layer precursor can be applied over the make layer precursor and abrasive particles and the make and size layer precursors sufficiently cured to form a useable coated abrasive article. Curing may be accomplished using thermal and/or photochemical methods.

As with the make layer, the size layer can be likewise formed from a precursor composition (i.e., size layer precursor). The size layer can include any of the components listed hereinabove for use in the make layer precursor.

The amount of polyepoxide present in the size layer precursor typically ranges from about 40 to 80 percent by weight, preferably 50 to 70 percent by weight, and more preferably 55 to 65 percent by weight, based on the total weight of solids (i.e., nonvolatile components) in the make layer precursor, although amounts outside this range may also be used.

The amount of polyfunctional (meth)acrylate(s) present in the size layer precursor typically ranges from about 5 to about 50 percent by weight, preferably from about 15 to about 40 percent by weight, and even more desirably from about 25 to about 35 percent by weight, based on the total weight of solids (i.e., nonvolatile components) in the make layer precursor, although amounts outside this range may also be used.

The basis weight of the size layer (i.e., after curing) will also necessarily vary depending on the intended use(s), type(s) of abrasive particles, and nature of the coated abrasive article being prepared, but generally will be in the range of from 10 to 150 gsm, preferably from 20 to 80 gsm, and more preferably from 35 to 55 gsm. The size layer may be applied, for example, by any known coating method for applying a size layer to a flexible backing layer, including, for example, roll coating, extrusion die coating, curtain coating, and spray coating.

Next, the size layer precursor and any uncured make layer precursor are sufficiently cured to provide a usable coated abrasive article. In general, this curing step involves thermal and/or radiation energy (e.g., ultraviolet and/or visible actinic radiation or electron beam radiation), but this is not a requirement. Useful forms of thermal energy include, for example, heat and infrared radiation. Exemplary sources of thermal energy include ovens (for example, festoon ovens), heated rolls, hot air blowers. Exemplary sources of radiation energy include, for example, electron beam, ultraviolet light (e.g., from a medium pressure mercury bulb, a xenon flashlamp, or a type H or type D microwave-driven bulb), and visible light. Other sources of radiation energy include infrared and microwave. Electron beam radiation, which is also known as ionizing radiation, can be used at a dosage of about 0.1 to about 10 megarads (Mrad0, preferably at a dosage of about 1 to about 10 Mrad. Ultraviolet radiation refers to non-particulate radiation having a wavelength within the range of about 200 to about 400 nanometers (nm), preferably within the range of about 250 to 400 nm. In certain embodiments, the ultraviolet radiation can be provided by ultraviolet lights at a dosage of 100 to 300 Watts/cm. Visible radiation refers to non-particulate radiation having a wavelength within the range of about 400 to about 800 nm, and in certain embodiments, within the range of about 400 to about 550 nm.

Optionally a supersize layer may be applied to at least a portion of the size layer. If present, the supersize typically includes grinding aids and/or anti-loading materials. The optional supersize layer may serve to prevent or reduce the accumulation of swarf (the material abraded from a workpiece) between abrasive particles, which can dramatically reduce the cutting ability of the coated abrasive article. Useful supersize layers typically include a grinding aid (for example, potassium tetrafluoroborate), metal salts of fatty acids (for example, zinc stearate or calcium stearate), salts of phosphate esters (for example, potassium behenyl phosphate), phosphate esters, urea-formaldehyde resins, mineral oils, crosslinked silanes, crosslinked silicones, and/or fluorochemicals. Useful supersize materials are further described, for example, in U.S. Pat. No. 5,556,437 (Lee et al.).

The basis weight of the supersize layer, if present, can be from 1 to 50 gsm, more preferably 5 to 30 gsm, more preferably from about 10 to about 20 gsm. The supersize may contain a binder such as for example, those used to prepare the size or make layer, but it need not contain any binder resin. The supersize layer is generally dried and/or cured to provide a flexible abrasive article, which may be in sheet of web form, for example. Converting into particular shapes (e.g., rectangular sheets or discs) can be accomplished using conventional methods such as, for example die cutting, knife cutting, and laser cutting.

The resulting flexible abrasive article may be subjected to further conventional treatments such as, for example, printing, laser marking, trimming, perforating, flexing, post-curing, or a combination thereof.

In some preferred embodiments, the various components are selected such that the flexible abrasive article is sufficiently translucent or transparent that a user can visually perceive the workpiece while abrading without removing the flexible abrasive article from the surface of the workpiece. This offers an advantage as compared with paper-backed abrasive products.

Flexible abrasive articles according to the present disclosure are typically well-suited for use in hand sanding applications to painted or unpainted wood or metal workpieces (e.g., furniture and architectural trim such as moldings, handrails, or cabinetry), especially involving curved and/or complex surface shapes. Advantages of flexible abrasive products according to the present disclosure for this use may include one or more of excellent hand feel, hand grip, see-through translucency, and flexibility and conformability to workpiece surfaces comprises architectural trim having three-dimensional detail.

SELECT EMBODIMENTS OF THE PRESENT DISCLOSURE

Embodiment 1. A method comprising: providing a removable support sheet having a first major support surface;

printing an image layer comprising inks onto the first major surface;

extruding a backing layer onto the image layer forming a first major backing surface over the image layer and a second major backing surface opposite the first major backing surface;

applying a functional layer onto the second major backing surface; and separating the removable support sheet from the backing layer while leaving the image layer attached to the first major backing surface.

Embodiment 2. The method of embodiment 1 wherein applying the functional layer comprises applying a make coat, applying abrasive particles, and applying a size coat over the make coat and the abrasive particles.

Embodiment 3. The method of embodiment 1 comprising applying a first coat layer on the first major support surface prior to applying the image layer.

Embodiment 4. The method of embodiment 3 wherein the first coat layer compromises polyurethane.

Embodiment 5. The method of embodiment 3 wherein the first coat layer comprises octyldecyl acrylate.

Embodiment 6. The method of embodiments 1 or 3 comprising applying a top coat layer onto the image layer prior to extruding the backing layer onto the image layer.

Embodiment 7. The method of embodiment 6 wherein the top coat layer comprises polyurethane.

Embodiment 8. The method of embodiment 1 wherein the backing layer comprises polyurethane.

Embodiment 9. The method of embodiment 1 wherein the removable support sheet comprises polyethylene terephthalate.

Embodiment 10. An article comprising:

a removable support sheet having a first major surface;

an image layer comprising inks applied over the first major surface;

a polyurethane backing layer having a first major backing surface located adjacent to the image layer and a second major backing surface opposite the first major surface; and a functional layer comprising an abrasive layer applied to the second major surface; the abrasive layer comprising a make coat, abrasive particles and a size coat.

Embodiment 11. The article of embodiment 10 wherein the removable support sheet comprises polyethylene terephthalate.

Embodiment 12. The article of embodiment 10 comprising a first coat layer located between the removable support sheet and the image layer.

Embodiment 13. The article of embodiment 12 wherein the first coat layer compromises polyurethane.

Embodiment 14. The article of embodiments 10 or 12 comprising a top coat layer located between the image layer and the polyurethane backing layer.

Embodiment 15. The article of embodiment 14 wherein the top coat layer comprises polyurethane.

EXAMPLES

Objects and advantages of this disclosure are further illustrated by the following non-limiting examples. Particular materials and amounts thereof recited in these examples, however, as well as other conditions and details, should not be construed to unduly limit this disclosure.

The Following Abbreviations are Used to Describe the Examples:

° C.: degrees Centigrade
cm: centimeter
G/eq.: grams per equivalent
g/m$^2$: grams per square meter
g/mol: grams per mole
mil: $10^{-3}$ inch
mm: millimeter
μm: micrometer
UV: ultraviolet
W/in: Watts per inch
W/cm: Watts per centimeter Unless stated otherwise, all reagents were obtained or are available from chemical vendors such as Sigma-Aldrich Company, St. Louis, Missouri, or may be synthesized by known methods. Unless otherwise reported, all ratios and percentages are by weight.

Abbreviations for Materials and Reagents Used in the Examples are as Follows:

ACR: Trimethylolpropane triacrylate.
AMOX: Di-t-amyl oxalate.
CHDM: 1,4-cyclohexanedimethanol.
EP1: A bisphenol-A epichlorohydrin based epoxy resin having an epoxy equivalent weight of 525-550 g/eq. and an average epoxy functionality of 2, available as “EPON 1001F” from Momentive Specialty Chemicals, Inc., Columbus, Ohio.
EP2: A bisphenol-A epoxy resin having an epoxy equivalent weight of 185-192 g/eq. and an average epoxy functionality of 2, available as “EPON 828” from Momentive Specialty Chemicals, Inc., Columbus, Ohio.
EP3: (3',4'-epoxycyclohexylmethyl) 3',4'-epoxycyclohexanecarboxylate.
INK1: SL-800 3M Red HSOV400139 Ink, from Sun Chemical Co., Parsippany-Troy Hills, NJ
INK2: RED INK (FLEXOMAX SPQFS4717123) 3M RED, from Sun Chemical Co., Parsippany-Troy Hills, NJ INK3: TLMFS1716506 SL-800 White: D905, from Sun Chemical Co., Parsippany-Troy Hills, NJ INK4: HSOV 500139/D947 SL-800 400 Blue Ink IPA: Isopropyl alcohol P800: A grade P800 aluminum oxide abrasive mineral, obtained under the trade designation “ALODUR BFRPL” from Treibacher Industrie AG.

P2000: A grade WA1200 aluminum oxide abrasive mineral, obtained from Fujimi

PC1: Mixture of 4-thiophenylphenyl diphenyl sulfonium hexafluoroantimonate, and bis[4-(diphenylsulfonio)phenyl]sulfide bis(hexafluoroantimonate) in propylene carbonate, obtained under the trade designation CPI 6976 from Aceto Corporation, Port Washington, New York.

PC2: 2,2-dimethoxy-2-phenylacetophenone, obtained under trade designation IRGACURE 651 from BASF, Wyandotte, Michigan.

PC3: $\eta^6$-[xylene(mixed-isomers)]$\eta^5$-cyclopentadienyliron (1+) hexafluoro antimonate(1).

PC4: Ethyl(2,4,6-trimethylbenzoyl)phenylphosphinate, obtained under the trade designation IRGACURE TPO-L from BASF, Wyandotte, Michigan.

PEP: A high molecular weight, hydroxyl-terminated, saturated, linear, semi-crystalline, copolyester, with a weight average molecular weight of 35,000 g/mol, available as “DYNAPOL S 1227” from Evonik Industries, Parsippany, New Jersey.

PET1: A 1.97 mil thick polyethylene terephthalate film with product identification of 00602197, available from 3M Company PET2: A 1.97 mil thick polyethylene terephthalate film with product identification of Hostsphan 2262, available from Mitsubishi Polyester Film, Inc.

PI: 2-hydroxy-2-methyl-1-phenyl-1-propanone.

PropCarb: Propylene carbonate, obtained under the trade designation JEFFSOL PC from Huntsman Corp, Woodlands, Texas.

PUR1: A polyurethane resin, obtained under the trade designation ESTANE 58887 from Lubrizol Corporation.

STY: Styrenic block copolymer, obtained under the trade designation VECTOR 4111A from TSRC Corporation, Taiwan.

SU-22-196: A polyurethane solution that is available from Stahl Polymers,

SU-96-603: A polyurethane solution that is available from Stahl Polymers,

ZNST: A 39-41 percent by weight aqueous zinc stearate soap dispersion obtained under trade designation EC994C from eChem LTD, Leeds, UK.

Preparation of Make Resin #1

A make resin #1 was prepared, according to the compositions listed in Table 1. AMOX, EP1, EP2, CHDM and PEP were directly metered to a twin-screw extruder running at 300 revolutions per minute with temperature zones of 30, 105, 110, 100, 65, and 60° C. This mixed resin was then fed to a pin mixer running at 1750 revolutions per minute, and ACR, PC2, PC3, PC4, and PropCarb were directly metered into the pin mixer.

TABLE 1

| COMPONENT | MAKE RESIN #1 COMPOSITION (% By Wt.) |
|---|---|
| EP1 | 22.0 |
| EP2 | 30.0 |

TABLE 1-continued

| COMPONENT | MAKE RESIN #1 COMPOSITION (% By Wt.) |
|---|---|
| PEP | 28.0 |
| ACR | 14.0 |
| CHDM | 2.8 |
| PC2 | 0.5 |
| PC3 | 0.7 |
| PC4 | 0.3 |
| PropCarb | 1.1 |
| AMOX | 0.6 |

Preparation of Make Resin #2

A make resin #2 was prepared, according to the compositions listed in Table 2. AMOX, EP1, EP2, CHDM and PEP were directly metered to a twin-screw extruder running at 300 revolutions per minute with temperature zones of 30, 105, 110, 100, 65, and 60° C. This mixed resin was then fed to a pin mixer running at 1750 revolutions per minute, and ACR, PC2, PC3, PC4, and PropCarb were directly metered into the pin mixer.

TABLE 2

| COMPONENT | MAKE RESIN #2 COMPOSITION (% By Wt.) |
|---|---|
| EP1 | 24.0 |
| EP2 | 32.0 |
| PEP | 28.0 |
| ACR | 10.0 |
| CHDM | 2.8 |
| PC2 | 0.5 |
| PC3 | 0.7 |
| PC4 | 0.3 |
| PropCarb | 1.1 |
| AMOX | 0.6 |

Preparation of Size Resin

Table 3 below lists the components and the amounts used to formulate the Size Resin. The size resin was prepared by combining and mixing EP2, EP3 and ACR, in a container. Prior to abrasive making, PC1 and PI were added to the premixed resin batch and stirred for 30 minutes at room temperature (i.e., 20-24° C.) until homogeneous.

TABLE 3

| INGREDIENT TYPE | Size Resin (% By Wt.) |
|---|---|
| EP2 | 38.4 |
| EP3 | 28.8 |
| ACR | 28.8 |
| PC1 | 3 |
| PI | 1 |

Preparation of Coating Formulation #1

Table 4 below lists the components and the amounts used to formulate the Coating Formulation #1. This formulation was prepared by combining and mixing

TABLE 4

| INGREDIENT TYPE | Formulation #1 (% By Wt.) |
|---|---|
| SU-22-196 | 36 |
| SU-96-603 | 14 |

TABLE 4-continued

| INGREDIENT TYPE | Formulation #1 (% By Wt.) |
|---|---|
| Toluene | 40 |
| IPA | 10 |

Preparation of Coating Formulation #2

Table 5 below lists the components and the amounts used to formulate the Coating Formulation #2. This formulation was prepared by combining and mixing.

TABLE 5

| INGREDIENT TYPE | Formulation (% By Wt.) |
|---|---|
| SU-22-197 | 50 |
| Toluene | 37.5 |
| IPA | 12.5 |

Example #1

A sheet of PET1 was used as a removable support layer and had a release coating consisting of a copolymer of stearyl acrylate and isostearyl acrylate applied to the second major surface 109. A85 LPI, 18 bcm gravure roll operating in reverse mode was used to apply Coating Formulation #1 as the optional first coat layer 110 to the opposing first major surface 107 of PET1. This formulation was oven-dried, and then a pattern of INK1 was applied using a gravure printing method to form image layer 120. The ink was oven-dried, and then another 85 LPI, 18 bcm gravure roll operating in forward mode was used to apply Coating Formulation #2 over the image layer as the top coat layer 130. An extrusion process was then used to apply a 0.002" thick layer of PUR1, forming the flexible backing layer 140, onto the surface of Coating Formulation #2. Then Make Resin #1 was then coated onto the PUR1 surface at a nominal coating weight of 16.5 g/m$^2$ and the film assembly passed under a Fusion UV Systems with one set of D-bulbs and one set of V-bulbs, both operating at 600 W/in (236 W/cm). Abrasive mineral P2000 was then coated onto the make layer at a nominal coating weight of 14 g/m$^2$ and the web was then heated under infrared heaters, at a nominal web temperature setting of 100° C., for about 7 seconds. The Size Resin was then roll coated onto the make layer and abrasive particles at a nominal dry coating weight of 7 g/m$^2$ and passed under a Fusion UV Systems with one set of H-bulbs, and two sets of D-bulbs, all three operating at 600 W/in (236 W/cm). It was then processed through infrared ovens having a target exit web temperature of 125° C. ZNST at a nominal coating weight of 4 g/m$^2$ was then coated onto the size layer and processed through a drying oven with a target exit web temperature of 135° C. The PET1 removable support layer was then separated from the multi-layer construction to provide a piece of PET1 and an abrasive article having an image layer on the flexible backing layer. The PET1 was clear while the abrasive article contains the ink layer, indicating that the ink had transferred from the PET1 removable support layer to the back surface of PUR1 flexible backing layer.

Example #2 (Same as Example #1, Except there is No Coating Formulation #2)

A sheet of PET1 was used as a removable support layer and had a release coating consisting of a copolymer of stearyl acrylate and isostearyl acrylate applied to the second major surface 109. A85 LPI, 18 bcm gravure roll operating in reverse mode was used to apply Coating Formulation #1 as the optional first coat layer 110 to the opposing first major surface 107 of PET1. This formulation was oven-dried, and then a pattern of INK1 was applied using a gravure printing method to form image layer 120. An extrusion process was then used to apply a 0.002" thick layer of PUR1, forming the flexible backing layer 140, onto the image layer. Then Make Resin #1 was then coated onto the PUR1 surface at a nominal coating weight of 16.5 g/m$^2$ and the film assembly passed under a Fusion UV Systems with one set of D-bulbs and one set of V-bulbs, both operating at 600 W/in (236 W/cm). Abrasive mineral P2000 was then coated onto the make layer at a nominal coating weight of 14 g/m$^2$ and the web was then heated under infrared heaters, at a nominal web temperature setting of 100° C., for about 7 seconds. The Size Resin was then roll coated onto the make layer and abrasive particles at a nominal dry coating weight of 7 g/m$^2$ and passed under a Fusion UV Systems with one set of H-bulbs, and two sets of D-bulbs, all three operating at 600 W/in (236 W/cm). It was then processed through infrared ovens having a target exit web temperature of 125° C. ZNST at a nominal coating weight of 4 g/m$^2$ was then coated onto the size layer and processed through a drying oven with a target exit web temperature of 135° C. The PET1 removable support layer was then separated from the multi-layer construction to provide a piece of PET1 and an abrasive article having an image layer on the flexible backing layer. The PET1 was clear while the abrasive article contains the ink layer, indicating that the ink had transferred from the PET1 removable support layer to the back surface of PUR1 flexible backing layer.

Example #3

A gravure coating process was used to apply a thin coating of a copolymer made by copolymerizaing stearyl acrylate and isostearyl acrylate onto the second major surface 109 of removable support layer PET2. This coating was applied with the gravure cylinder operating in reverse mode. During the same pass through the press, an image layer was applied with INK2 using a 150 LPI, 9.6 bcm gravure cylinder operating in forward mode onto the first major surface 107. An extrusion process was then used coat apply a 0.0025" thick layer of PUR1, as a flexible backing layer 140 onto the image layer. The Make #2 Resin was then coated onto the PUR1 surface at a nominal coating weight of 16.5 g/m$^2$ and the film assembly passed under a Fusion UV Systems with one set of D-bulbs and one set of V-bulbs, both operating at 600 W/in (236 W/cm). Abrasive mineral P800 was then coated onto the make layer at a nominal coating weight of 25 g/m$^2$ and the web was then heated under infrared heaters, at a nominal web temperature setting of 100° C., for about 7 seconds. The Size Resin was then roll coated onto the make layer and abrasive particles at a nominal dry coating weight of 11 g/m$^2$ and passed under a Fusion UV Systems with one set of H-bulbs, and two sets of D-bulbs, all three operating at 600 W/in (236 W/cm). It was then processed through infrared ovens having a target exit web temperature of 125° C. ZNST at a nominal coating weight of 6 g/m$^2$ was then coated onto the size layer and processed through a drying oven with a target exit web temperature of 135° C. The PET2 removable support layer was then separated from the multi-layer construction to provide a piece of PET2 and an abrasive article having an image layer on the flexible backing layer. The PET2 was clear while the abrasive article contains the ink image, indicating that the ink had transferred from the PET2 removable support layer to the back surface of PUR1 flexible backing layer.

Example #4

A flexographic coating process with three printing stations was used to print the first major surface 107 of the PET2 removable support layer. The first printing station applied a flood coating of INK3 using an Anilox roll that was 300 LPI and 7.0 bcm. The second printing station applied a flood coating of INK4 using Anilox roll that was 300 LPI and 7.0 bcm. The third printing station applied an image of INK3 using an Anilox roll that was 300 LPI and 7.25 bcm. The three ink layers forming the image layer 120. An extrusion process was then used coat apply a 0.002" thick layer of PUR1 for the flexible backing layer 140 onto the printed image layer. Make #2 Resin was then coated onto the second major surface 144 of PUR1 at a nominal coating weight of 16.5 $g/m^2$ and the film assembly passed under a Fusion UV Systems with one set of D-bulbs and one set of V-bulbs, both operating at 600 W/in (236 W/cm). Abrasive mineral P800 was then coated onto the make layer at a nominal coating weight of 25 $g/m^2$ and the web was then heated under infrared heaters, at a nominal web temperature setting of 100° C., for about 7 seconds. The Size Resin was then roll coated onto the make layer and abrasive particles at a nominal dry coating weight of 11 $g/m^2$ and passed under a Fusion UV Systems with one set of H-bulbs, and two sets of D-bulbs, all three operating at 600 W/in (236 W/cm). It was then processed through infrared ovens having a target exit web temperature of 125° C. ZNST at a nominal coating weight of 6 $g/m^2$ was then coated onto the size layer and processed through a drying oven with a target exit web temperature of 135° C. The PET2 removable support layer was then separated from the multi-layer construction to provide a piece of PET2 and an abrasive article having an image layer on the flexible backing layer. The PET2 was clear while the abrasive article contains the ink image, indicating that the ink had transferred from the PET2 removable support layer to the back surface of PUR1 flexible backing layer.

What is claimed is:

1. A method comprising:

providing a removable support sheet having a first major support surface;

printing an image layer comprising inks directly onto the first major support surface;

extruding a backing layer over the image layer forming a first major backing surface over the image layer and a second major backing surface opposite the first major backing surface;

applying a functional layer onto the second major backing surface; and separating the removable support sheet from the backing layer while leaving the image layer attached to the first major backing surface, wherein the image layer releases from the removable support sheet upon separating.

2. The method of claim 1, wherein applying the functional layer comprises applying a make coat, applying abrasive particles, and applying a size coat over the make coat and the abrasive particles.

3. The method of claim 1, further comprising applying a top coat layer onto the image layer prior to extruding the backing layer onto the image layer.

4. The method of claim 3, wherein the top coat layer comprises polyurethane.

5. The method of claim 1, wherein the backing layer comprises polyurethane.

6. The method of claim 1, wherein the removable support sheet comprises polyethylene terephthalate.

7. The method of claim 1, wherein the backing layer is a single layer.

8. The method of claim 1, wherein the backing layer comprises a thermoplastic polyurethane.

9. The method of claim 1, wherein the backing layer is non-adhesive.

10. The method of claim 1, wherein the removable support sheet has dimensional stability and is a single layer.

11. The method of claim 1, further comprising applying an additional coating or layer directly to at least a portion of the image layer, wherein the additional coating or layer is selected from adhesives, woven fabric layers that provide loops for releasable attachment, or friction modifying surfaces.

12. An article comprising:

a removable support sheet having a first major surface;

an image layer comprising inks applied over the first major surface;

a polyurethane backing layer having a first major backing surface located adjacent to the image layer and a second major backing surface opposite the first major surface;

a top coat layer located between the image layer and the polyurethane backing layer; and a functional layer comprising an abrasive layer applied to the second major backing surface; the abrasive layer comprising a make coat, abrasive particles and a size coat.

13. The article of claim 12, wherein the removable support sheet comprises polyethylene terephthalate.

14. The article of claim 12, wherein the top coat layer comprises polyurethane.

* * * * *